Jan. 7, 1964  R. R. BOELTER  3,117,009
METHOD AND APPARATUS FOR PRODUCING A STARTER
CULTURE FOR MAKING CHEESE AND THE LIKE
Filed Jan. 16, 1962  2 Sheets-Sheet 1
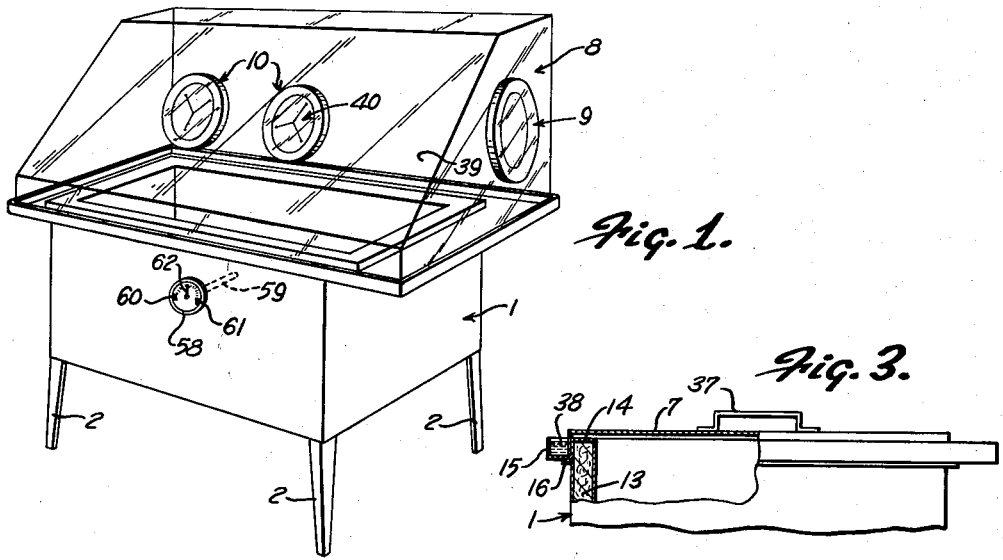
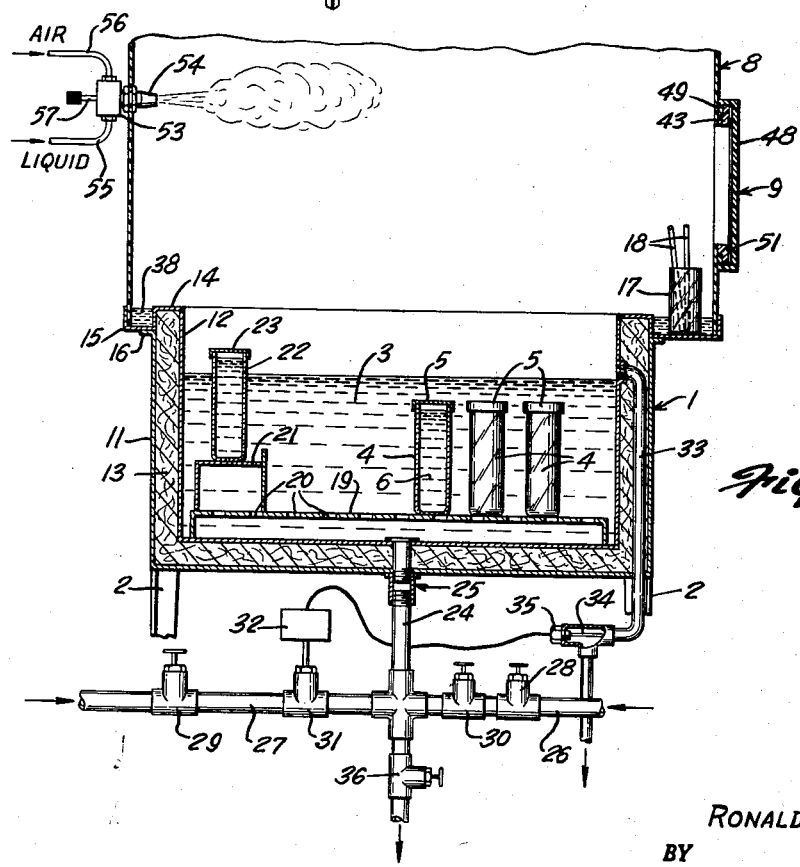
INVENTOR.
RONALD R. BOELTER
BY
Andrus & Starke
ATTORNEYS INVENTOR.
RONALD R. BOELTER
BY
Andrus & Starke
ATTORNEYS United States Patent Office 3,117,009
Patented Jan. 7, 1964

3,117,009
METHOD AND APPARATUS FOR PRODUCING A STARTER CULTURE FOR MAKING CHEESE AND THE LIKE
Ronald R. Boelter, Grand Chute, Wis., assignor to R. R. Boelter Company, Inc., Neenah, Wis., a corporation of Wisconsin
Filed Jan. 16, 1962, Ser. No. 166,598
15 Claims. (Cl. 99—116)

This invention relates to a method and apparatus for producing a starter culture for initiating a cheese-forming reaction and the like and particularly a very high quality starter culture.

In the manufacture of cheese, milk and other necessary ingredients are placed in a large vat. A bacteria starter culture is added to initiate the cheese-forming reaction.

The bacteria starter culture is generally formed from a mixture of water and skim milk which is first sterilized and pasteurized and then inoculated with a proper bacteria media, called the mother culture. The mother culture may be a specially processed powder or a previously formed starter culture.

The standard starter culture is however extremely temperature sensitive and must be produced in separate culture rooms wherein the temperature is very closely regulated. A temperature change of even two or three degrees Fahrenheit can adversely affect the quality of the starter culture. The final cheese product is directly related to the quality of the starter culture and consequently extreme care is normally taken in producing the culture. Further, the quantity of starter culture required to produce higher grades of cheese is also related to the quality.

The starter culture is also highly subject to deterioration in the presence of contamination with other bacteria. For example, prior to the inoculation with a proper bacteria media, the mixture of water and skim milk must be cooled. During the cooling process, a vacuum is formed within the culture containing bottle, or the like, and tends to draw in foreign matter. Any foreign bacteria which is drawn into the bottle adversely affects the culture and the resulting cheese product.

As a result of the sensitivity of the culture to temperature changes and to deterioration by contamination with other bacteria, separate culture rooms are normally provided with highly accurate temperature control and other means to maintain the air and room as clean and sterile as possible. For example, during the culture forming process, a chlorine fog is often applied to the room to insure the sterile character.

Systems heretofore known, though feasible, are relatively complicated, expensive and difficult to maintain. This is particularly true because bacteria can enter in the presence of extremely minute openings. Further, chlorine fogging although serving to satisfactorily sterilize the culture room, releases chlorine salts which are highly corrosive and will attack the metal elements in the culture room.

The present invention is directed to a method and apparatus for producing the starter culture in a small cabinet preferably having a separate cooking cover and working hood during the complete culture forming process. The culture bottle with the water and the skim milk mixture is immersed in a pasteurizing and sterilizing water bath within the cabinet which is releasably closed with a top cover. The water is raised to the proper temperature to sterilize and pasteurize the mixture. Thereafter, the bottle is maintained immersed within the bath and is allowed to gradually cool to the temperature at which the bacteria media or mother culture is added. The cover is removed and the mother culture placed within the cabinet and a hood placed over the cabinet. A chlorine or other suitable atmosphere is established within the cabinet to insure sterilization after which the water bath level is dropped to allow inoculation of the culture. Suitable operating means are provided to allow inoculation without contaminating the atmosphere within the cabinet. Preferably, releasably sealed openings are provided in the hood through which the operator's hands and arms are projected for transferring the bacteria media from its container into the culture bottle. After inoculation, the culture bottle is again tightly sealed and may or may not be immersed. The latter immersion is normally desirable to insure complete sealing against possible entrance of bacteria or other contaminating foreign matter.

In accordance with the present invention, automatic timing means are preferably provided for heating of the culture and the like.

The present invention provides a method and apparatus for forming the starter culture used in making cheese and other culture initiated products wherein the temperature and sterilization are very closely and accurately controlled with a resulting high quality starting culture and resultant cheese.

The drawings furnished herewith illustrate the best mode presently contemplated for carrying out the invention.

In the drawings:

FIG. 1 is a perspective view of a culture processing cabinet constructed in accordance with the present invention;

FIG. 2 is a vertical section through the cabinet;

FIG. 3 is a small fragmentary view of the processing cabinet with a cover replacing the hood of FIG. 1;

Figure 4:
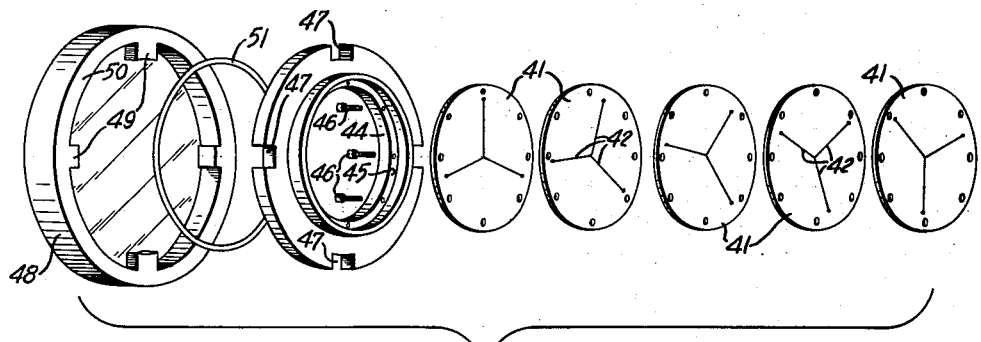
FIG. 4 is an exploded view of a front opening sealing structure shown in FIG. 1.

Referring to the drawings and particularly to FIGS. 1–3, a culture processing unit constructed in accordance with the present invention is illustrated generally including an open top water tank 1 secured to vertical supporting legs 2. A bath 3 of water is provided in the tank 1 with the upper level of the water being either somewhat below or completely over the top of a series of releasably sealed bottles 4 having removable top caps 5, as shown in FIG. 2. Bottles 4 each contains a liquid mixture 6 of skim milk and water which is to be treated and inoculated to form a starter culture. During the initial portion of the process, a relatively flat cover 7 is disposed over the top of the tank 1 to prevent evaporation of the water from bath 3 into the culture processing room. Thereafter, during the inoculating period, an upper hood 8 is sealed to the top of the tank 1 and defines a totally enclosed inoculating chamber. Hood 8 includes a sealed side opening 9 and a pair of adjacent sealed front openings 10 for placing and removing items from the inoculating chamber and for working in the chamber as hereinafter described.

Referring particularly to FIG. 2, the tank 1 is constructed of superimposed rectangularly shaped inner and outer base members 11 and 12 with a thermal insulation 13 disposed therebetween to substantially eliminate heat loss from the water bath 3 within the tank 1. An upper ledge 14 is welded to the upper end of member 11 and extends outwardly and terminates in an integral trough section 15 of rectangular cross-sections encircling the member 11. Trough section 15 rests upon and is welded or otherwise secured to a ledge 16 on the upper end of the member 12 on the front, back and left side, as viewed in FIGS. 1 and 2. To the right said of the tank 1, the trough section 15 is extended outwardly to provide a table area for supporting any necessary operating implements such as the container 17 for pipettes 18 for inoculation of the liquid 6 as hereinafter described.

A water distributing plate 19 having a plurality of openings 20 rests on the bottom of tank 1 to support the bottles 4 and to evenly distribute the incoming water which is introduced through the bottom of tank 1.

A small shelf 21 is shown disposed to the left side of the tank 1 on the plate 19. A bottle 22 generally corresponding to bottles 4 and containing a previously formed starter culture liquid is placed on shelf 21 after removal of cover 7 and before positioning of hood 8 on tank 1. The shelf 21 is of a proper height to hold the upper end 23 of bottle 22 above the uppermost level of the water bath 3.

A steam and water pipe 24 is connected to the center of the bottom of tank 1 by a suitable coupling unit 25. A water pipe 26 and a steam pipe 27 are connected respectively to the steam and water conduit 24. Manually operated on-off valves 28 and 29 are provided respectively in lines 26 and 27 for connecting the tank 1 to suitable sources of water and steam. A needle control valve 30 is connected in water line 26 to establish a preset flow of water into tank 1. A modulating valve 31 is connected in steam pipe 27 and includes an operating drive unit 32 to continuously adjust the steam-water mixture for automatic regulation of the temperature of bath 3 as hereinafter described.

A high-level overflow pipe 33 is secured to the inner member 11 adjacent the upper level of bath 3 and extends downwardly between the members 11 and 12 and out of tank 1.

A temperature sensing unit 34 is mounted in the overflow pipe 33 by a suitable coupling 35 and is connected to the drive unit 32 for controlling the valve 31 for automatic temperature regulation, as hereinafter described. A drain valve 36 is connected to the pipe 24 to allow lowering of the level of bath 3 and access to caps 5 of bottles 4.

During the initial processing of the culture liquid 6, the cover 7 is disposed over the tank 1. Cover 7 is generally a flat rectangular metal cover having depending side walls which are slightly deeper than the trough section 15. A handle 37 is provided on the top of the cover 7 for placing and removing the cover on the tank 1. The side walls rest in trough section 15 to support the cover 7 in proper position close to the tank 1. A chlorine water 38 substantially fills the trough section 15 and establishes a water seal which prevents contaminating bacteria and other foreign matter from entering tank 1.

When the liquid 6 has been sterilized and is in condition for inoculation, the cover 7 is removed and the hood 8 placed on the top of tank 1.

The hood 8 is open at the bottom with the lower end of hood 8 resting within the trough 15 of tank 1 contiguous to the outer side wall of the trough. The chlorine water 38 in trough section 15 maintains a liquid seal between the hood 8 and tank 1.

The hood 8 is formed of clear plastic or other suitable material and includes an inclined forward or front wall 39 having the openings 10 provided therein and sealed with soft rubber-like diaphragm units 40, shown most clearly in FIG. 4.

Referring particularly to FIG. 4, each of the diaphragm units 40 includes a plurality of stacked individual round soft rubber-like discs 41 having three radial slits 42 equicircumferentially spaced and extending from the center of each opening.

A slotted ring 43 includes a central spacing hub 44 which is secured to the hood 8 at each opening 10 and spaces the ring 43 from the front wall 39. The hub 44 includes an internal clamping shoulder 45 having a diameter corresponding to discs 41 which are disposed between the shoulder 44 and the front wall of the hood 8. Small cap screws 46 pass through shoulder 44 and discs 41 and thread into suitable tapped openings in hood 8 to clamp the discs 41 over the openings 10.

The slits 42 in adjacent discs 41 are angularly offset and when the operator places his hands and arms through the diaphragm units 40 to inoculate the liquid 6, the soft rubber-like discs 41 tightly cling to the arms and maintain a seal at the openings. In this manner, foreign matter is prevented from entering the cabinet.

Ring 43 includes four equicircumferentially spaced edge recesses 47. A cap 48 includes a plurality of radial projections 49 integrally formed on the inner edge of circular cap rim 50 and spaced in accordance with slots 47. Cap 48 is placed over the corresponding ring 43 and turned to releasably close the opening 10. An O-ring seal 51 is disposed between the adjacent faces of cap 48 and ring 43 to seal the opening.

The side opening 49 includes a cap 52 which is secured to hood 8 generally in accordance with the securement construction of the cap 49 to releasably close the opening for removing bottles 4 and 22 from the cabinet.

A chlorine fogger 53 is secured to the side wall of hood 8 opposite the opening 9 and includes a nozzle 54 projecting into the hood. A chlorine line 55 and an air line 56 are secured to the fogger 53 for supplying a chlorine fog within the cabinet. A small needle valve control 57 is provided to control the mixture of air and chlorine introduced into the cabinet.

Figure 5:
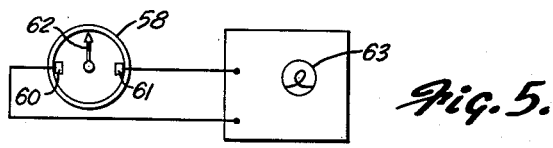
FIG. 5 is a schematic circuit diagram of a temperature signal control.

In the illustrated embodiment of the invention, a thermometer 58 is secured to the front of tank 1 and includes a sensing unit 59 projecting into the bath 3. As more fully and clearly shown in FIG. 5, switches 60 and 61 are mounted within the path of a temperature indicator 62 of thermometer 58. Switches 60 and 61 are connected to actuate a suitable indicating means, such as a lamp 63, if the unit malfunctions during a cycle of operation.

Although as subsequently described, the temperature of bath 3 may be automatically controlled, the apparatus may be manually controlled as follows.

The culture liquid 6 is placed in the bottles 4 which are then sealed with a suitable leakproof cover or lid 5 and placed within the tank 1. The water valves 28 and 30 and the steam valve 29 are opened and the tank 1 filled to the level of the overflow pipe 33 which will automatically maintain this level. The valves 29 and 30 are manually adjusted to set the temperature of the bath 3 at 200° F. at which temperature the bath 3 is held for one hour for pasteurizing and sterilizing of the liquid 6. At the end of one hour, valve 29 is closed and the temperature of the bath 3 is allowed to slowly decrease to 70° F. Valves 29 and 30 are then adjusted to maintain this temperature for 30 minutes after which these valves are closed to allow the liquid 6 to be inoculated.

The cover 7 is removed and the mother culture bottle 22 and the container 17 with pipettes 18 therein are then placed on the supporting ledges as shown in FIG. 2 and the hood 8 placed on the tank 1 with the lower edge resting in trough section 15.

The chlorine fogger 53 is actuated to establish a chlorine fog within the hood 8 which sterilizes the atmosphere therein. The bath 3 is then lowered by manually opening of the valve 36 until the lids 5 of bottles 4 are exposed.

Caps 49 are removed from the openings 10 and the operator places his arms through the sealing discs 41. The lids 5 and 23 are removed and the required quantity of the bacteria media or mother culture in bottle 22 transferred to the bottles 4 by the use of pipettes 18. Bottles 22 and 5 are then again sealed and bottle 22 is placed on the ledge adjacent the opening 9.

The water valve 29 and steam valve 30 are opened to raise the level of bath 3 to that of overflow pipe 33 and again immerse the bottles 5. The temperature of bath 3 is set at 72° F. and then the valves 29 and 30 are closed. The insulated tank 1 will maintain the temperature during the propagation period.

After the culture is completely formed, cap 52 is removed and bottles 5 and 22 are removed from the cabinet and stored in a suitable refrigerator for subsequent use or they may be used directly.

Although the illustrated embodiment of the invention employs the separate cover 7 and hood 8, the cover 7 can be eliminated, if desired. However, during the sterilization process, the heating and cooling of the atmosphere within the hood would create forcing tending to deform the hood which would then have to be strengthened to within such forces. Further, the vaporization of bath 3 would result in condensation forming on the walls of hood 8 and interfere with the viewing by the operator when inoculating.

Figure 6:
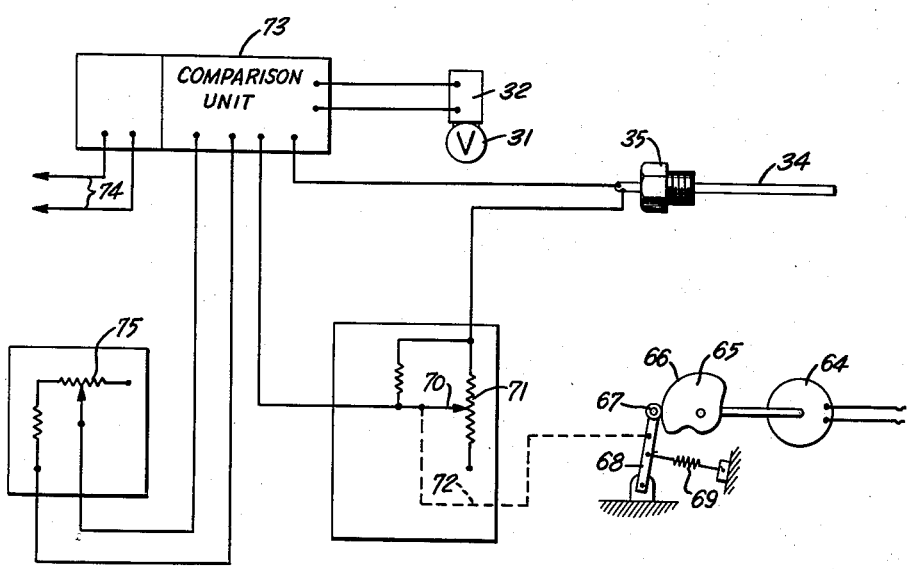
FIG. 6 is a schematic circuit diagram of an automatic control for the cabinet of FIGS. 1 and 2.

Referring particularly to FIG. 6, an automatic control circuit for controlling the temperature cycle of processing the starter culture is schematically shown.

A timer motor 64 is connected to drive a rotating cam 65 having a contoured peripheral cam edge 66. The contour of the cam edge 66 is formed to automatically establish and maintain the desired temperature of the bath 3 during the pasteurization period as hereinafter described. A follower 67 is secured to the end of a pivotal arm 68 which is biased by a spring 69 to hold the follower 67 on the cam edge 66.

The arm 68 is coupled to a sliding contact 70 of a potentiometer 71, as shown by the dashed coupling line 72 for adjusting the connection of the potentiometer in a temperature control, as follows.

A differential or voltage comparison unit 73 of any suitable and well-known usage is provided and is shown in block diagram in the drawings. Unit 73 may, for example, be a resistance bridge circuit having input power lines 74 for connection to any suitable power source. The potentiometer 71 is connected in a series circuit with the temperature responsive sensing unit 34 within the unit 73 to form a part of the bridge circuit. The unit 34 is a wire wound resistor or the like which is temperature responsive to vary the resistance of the circuit in accordance with the temperature of the water. A preset potentiometer 75 is also connected in the unit 73 and establishes a reference against which the circuit including potentiometer 71 and sensing unit 34 is balanced. Unit 73 is constructed to provide an output signal until a predetermined balance or signal relationship is established between the circuit branch including unit 34 and the circuit branch including the potentiometer 75.

The output of the unit 73 is connected to actuate the drive device 32 for the modulating valve 31 in the steam pipe 27. Device 32 is any suitable electroresponsive means such as a hydraulically positioned motor assembly responsive to a solenoid which is actuated by the output of unit 73. The modulating valve 31 is thereby modulated to adjust the ratio of steam to water being introduced in the bath 3.

The automatic operation of the process is basically similar to the manual operation previously described. When employing the automatic control however, the potentiometer 75 is preset to establish a predetermined base temperature in the bath 3, normally 70° F. After placing the bottles 4 in the bath 3, the timer motor 64 is started to drive cam 65. The first portion of the cam 65 is contoured to hold the follower arm 68 in a position which sets the potentiometer 71 for a temperature of 200° F. The sensing unit 34 cooperates with the potentiometer to unbalance the unit 73 and establish an output to valve drive device 32 of valve 31 if the temperature of the bath 3 varies from 200° F. Device 32 adjusts the opening of valve 31 to accordingly increase or decrease the volume of steam fed to tank 1. In this manner, the temperature of bath 3 is held at 200° F.

At the end of one hour, cam 65 has rotated to align a second arcuate portion of the cam edge with follower 67. The second portion of the cam 65 continuously varies the setting of potentiometer 71 to unbalance the unit 73 and properly actuate valve 31 to slowly reduce the temperature of bath 3 to 70° F.

A third portion of cam 65 holds the potentiometer 71 in a condition to properly actuate valve 31 for holding the bath 3 at 70° F. for the required thirty minutes.

Thereafter, the operator completes the inoculating and propagation process as previously described in connection with the complete manual process.

The tank 1 and associated components are preferably thoroughly cleaned each day. The removable cover and hood with the water seal provide a very simple and convenient means therefor.

Normally, the above described process is sufficiently automatic for most cheese processing plants. However, the complete culture forming process could be automated by the addition of the necessary operating devices such as an automatic inoculating unit mounted within the cabinet, if desired.

The present invention thus provides a method and apparatus for forming a starter culture in a completely sterile and closely temperature regulated atmosphere. The quality of the starter culture made in accordance with the method and apparatus of the present invention is consistently of exceptionally high quality and consequently, the resulting cheese will be of a similar high quality. The loss associated with inferior or completely ineffective starter culture is also essentially eliminated.

Various modes of carrying out the invention are contemplated as being within the scope of the following claims particularly pointing out and distinctly claiming the subject matter which is regarded as the invention.

I claim:
1. Apparatus for producing a starter culture by inoculation of a suitable liquid in a sealed container with a proper bacteria media held in a separate container for use in processing of cheese and the like comprising:
    (a) a substantially releasably enclosed cabinet unit having means to support a liquid bath for selective immersion of the sealed container,
    (b) means to create a sterile atmosphere within the cabinet, and
    (c) means associated with said cabinet unit for allowing transfer of a bacteria media to the container while essentially maintaining the cabinet unit closed.
2. The construction of claim 1 having
    (a) an electroresponsive means to vary the temperature of the bath,
    (b) a control unit for regulating said electroresponsive means, and
    (c) a timer to actuate the control unit and to sequentially vary the temperature of the bath in a predetermined sequence to sterilize the liquid in the containers and condition the liquid for inoculation.
3. A device for use in producing a starter culture for forming cheese and the like by inoculating a liquid in a container with a bacterial media held in a suitable bacteria container, comprising:
    (a) a hermetically sealable housing having a liquid bath,
    (b) control means for adjusting the temperature of the bath to selected temperature levels,
    (c) means for removing said sealed container and said bacteria container from the bath,
    (d) means to adjust the level of the water in the bath to selectively immerse the sealed container, and
    (e) means for transferring the bacteria media to the container without substantially breaking the seal of the housing.
4. The construction of claim 3 wherein said control means includes automatic means for sensing the temperature of the bath and timed adjusting means for conjointly and automatically adjusting the temperature of the bath.

5. The construction of claim 3 having,
   (a) a temperature sensing unit mounted to sense the temperature of the liquid in the bath and to establish a resistance proportional thereto,
   (b) a comparison circuit including said sensing unit and a temperature adjusting resistance element to establish an output in accordance with the relationship therebetween,
   (c) temperature varying means connected to vary the temperature of the bath, and
   (d) a timed drive coupled to the temperature adjusting resisting element to adjust the condition of the comparison circuit and actuate the temperature varying means in accordance with a predetermined pattern.

6. The construction of claim 3 wherein the control means for adjusting the temperature of the bath includes,
   (a) a steam line having an electro-responsive modulating valve therein,
   (b) a water line,
   (c) means connecting said steam line and said water line to selectively introduce water and steam to the bath,
   (d) sensing means to sense the temperature of the bath, and
   (e) control means connected to the modulating valve and to the sensing means to automatically vary the temperature of the bath through a predetermined pattern.

7. A device for use in producing a starter culture for forming cheese and the like by inoculating a liquid in a container with a bacteria media held in a suitable bacteria container, comprising:
   (a) a closed housing having a removable top hood,
   (b) means to continuously supply a heated liquid to the housing,
   (c) an overflow drain pipe secured to the housing and establishing a liquid bath to immerse the sealed containers,
   (d) a separate drain pipe,
   (e) a valve to selectively close the last-named drain pipe,
   (f) a temperature sensing unit connected in said overflow drain pipe to sense the temperature of the liquid in the bath, and
   (g) means connected to the sensing unit to control the temperature of the bath.

8. Apparatus for producing a starter culture for manufacturing cheese and the like by inoculating a liquid in a container with a bacteria media housed in a suitable bacteria container, comprising:
   (a) a tank having a top opening,
   (b) means to admit liquid into the tank to establish a liquid bath,
   (c) means to maintain the water at selected temperatures,
   (d) means to adjust the level of the water in the tank,
   (e) a hood member removably secured to the top of the tank and having a releasable opening for inserting and removing the container to the water, and
   (f) means in said hood member to permit entrance to the hood without substantially opening the hood for introducing of the bacteria media to the sealed container within the hood.

9. The construction of claim 8 wherein:
   (a) an encircling trough corresponding to the configuration of the lower edge of the hood is provided on the tank,
   (b) the lower edge of said hood is disposed within said trough, and
   (c) a sterile liquid is provided in the trough to provide a liquid seal preventing entrance of contaminating foreign matter.

10. In a cabinet assembly for inoculating a liquid within a sealed container with a bacteria media held in a separate vial to form a starter culture for initiating a cheese forming process:
    (a) a tank having insulated side walls and a bottom wall,
    (b) an inlet conduit secured within the bottom wall and having means selectively connectable to a source of heated liquid,
    (c) a perforated baffle plate secured to the bottom wall to distribute the incoming heated liquid and to support the sealed container,
    (d) an overflow drain line connected to a side wall of the tank to maintain a liquid level above the top of the sealed container,
    (e) a drain line connected to the tank to establish a liquid level below the top of the sealed container,
    (f) a horizontal ledge on the upper end of the tank terminating in an outer encircling trough,
    (g) an upper transparent hood having a lower edge for mounting of the hood with the lower edge disposed within the trough, said hood having an upwardly and backwardly slanting front wall with a pair of arm openings and a side wall opening,
    (h) a flat cover having depending side walls for mounting of the cover with side walls disposed within the trough,
    (i) a chlorine liquid in the trough to seal the junction thereat,
    (j) a series of superimposed soft rubber-like diaphragms hermetically sealed to the openings, each of the diaphragms having radial slits extending from the center of the opening with the slits in adjacent openings being angularly offset, and
    (k) cap means releasably secured over the openings to hermetically close the openings.

11. Apparatus for producing a starter culture by inoculation of a suitable liquid in a sealed container with a proper bacteria media held in a separate container, comprising:
    (a) an open top tank having a liquid bath for immersing of the sealed container,
    (b) a flat cover including attachment means for releasably securing the cover to the tank for closing the top of the tank,
    (c) a hood including attachment means corresponding to the attachment means of the cover for closing the top of the tank and defining a closed working chamber and having releasably sealed openings permitting working within the chamber without substantially breaking the closure of the working chamber, and
    (d) a sealing liquid in the trough section establishing a liquid seal about the cover and the hood.

12. Apparatus for producing a starter culture by inoculation of a suitable liquid in a sealed container with a proper bacteria media held in a separate container, comprising:
    (a) an open top tank having a liquid bath for immersing of the sealed container and having an encircling trough section,
    (b) a flat cover for closing the top of the tank and having a lower edge corresponding to and fitting within the trough section,
    (c) a hood for closing the top of the tank and defining a closed working chamber and having a lower edge corresponding to and fitting within the trough section and having openings permitting working within the chamber without substantially breaking of the closure of the working chamber, and
    (d) a sealing liquid in the trough section establishing a liquid seal about the cover and the hood.

13. Apparatus for producing a starter culture by inoculation of a suitable liquid in a sealed container with a proper bacteria media held in a separate container, comprising:

(a) an open top tank having spaced inner walls and outer walls and means selectively connected to a source of liquid for establishing a liquid bath for selectively immersing of the sealed container, (b) thermal insulation between the walls of the tank, (c) a top ledge connected to the upper edges of the tank and including an integral outer trough section encircling said tank, (d) a flat cover for closing the top of the tank and having a depending side wall corresponding to and fitting within the trough section with the lower edge of the side walls resting on the bottom of the trough section, (e) a hood for closing the top of the tank and defining a closed working chamber and having a lower edge corresponding to and resting on the bottom of the trough section to support the hood on the tank and having openings permitting working within the chamber without substantially breaking of the closure of the working chamber, and (f) a sealing liquid in the trough section establishing a liquid seal about the cover and the hood.

14. The process of forming a starter culture for the making of cheese and the like, comprising the sequential steps of:

(a) immersing a sealed container containing a base starter culture liquid within a liquid bath provided in a closed cabinet, (b) heating the liquid bath to a sterilizing and pasteurizing temperature, (c) slowly cooling the liquid bath to an inoculating temperature with the container immersed in the water bath, (d) sterilizing the interior of the cabinet, (e) lowering the level of the liquid bath relative to the sealed container, and (f) inoculating the liquid in the releasably sealed container with a bacteria media within the cabinet.

15. The process of forming a starter culture for making of cheese and the like, comprising the sequential steps of:

(a) immersing a sealed container containing a base starter culture liquid within a liquid bath in an open top tank, (b) closing the tank with a flat cover, (c) heating the liquid bath to a sterilizing and pasteurizing temperature, (d) slowly cooling the liqud bath to an inoculating temperature with the container immersed in the water bath, (e) replacing the flat cover with a hood defining a working chamber and allowing viewing of the interior of the chamber and tank, (f) sterilizing the atmosphere within the working chamber, (g) lowering the level of the liquid bath relative to the sealed container, and (h) inoculating the liquid in the container with a bacteria media within the working chamber.

References Cited in the file of this patent
UNITED STATES PATENTS

| | | |
|---|---|---|
| 2,244,082 | Reyniers | June 3, 1941 |
| 2,786,740 | Taylor et al. | Mar. 26, 1957 |